(12) United States Patent
Berger

(10) Patent No.: US 8,796,588 B2
(45) Date of Patent: Aug. 5, 2014

(54) HEATED FLOOR PANEL FOR TRANSIT VEHICLE

(75) Inventor: Craig M. Berger, Stockbrige, MA (US)

(73) Assignee: RTR Technologies, Inc., Stockbridge, MA (US)

( * ) Notice: Subject to any disclaimer, the term of this patent is extended or adjusted under 35 U.S.C. 154(b) by 1014 days.

(21) Appl. No.: 11/374,917

(22) Filed: Mar. 14, 2006

(65) Prior Publication Data

US 2007/0215589 A1  Sep. 20, 2007

(51) Int. Cl.
*B60L 1/02* (2006.01)
*H05B 3/34* (2006.01)
*F24D 13/02* (2006.01)
*F24H 3/04* (2006.01)
*B60H 1/00* (2006.01)
*B61D 27/00* (2006.01)
*B61D 17/10* (2006.01)
*B60H 1/22* (2006.01)

(52) U.S. Cl.
CPC ...... *F24D 13/022* (2013.01); *B60H 2001/2293* (2013.01); *F24H 3/0429* (2013.01); *B60H 1/00271* (2013.01); *B60H 1/2225* (2013.01); *B60H 1/00371* (2013.01); *B60H 2001/00221* (2013.01); *B61D 27/0036* (2013.01); *B61D 17/10* (2013.01)
USPC .......................................... 219/202; 219/528

(58) Field of Classification Search
USPC .......................................... 219/202, 213, 528
See application file for complete search history.

(56) References Cited

U.S. PATENT DOCUMENTS

| 4,310,745 A | * | 1/1982 | Bender | 219/213 |
| 6,140,609 A | * | 10/2000 | Jones | 219/202 |
| 6,611,659 B2 | | 8/2003 | Meisiek | |
| 6,621,983 B2 | | 9/2003 | Thorin | |
| 6,824,851 B1 | | 11/2004 | Locher et al. | |
| 6,834,159 B1 | | 12/2004 | Schramm | |
| 6,897,417 B1 | * | 5/2005 | Usselman et al. | 219/528 |
| 7,180,033 B2 | * | 2/2007 | Morgandi | 219/212 |
| 7,211,772 B2 | * | 5/2007 | Carpino et al. | 219/528 |
| 7,274,007 B2 | * | 9/2007 | Fernandez et al. | 219/497 |

FOREIGN PATENT DOCUMENTS

| DE | 4123129 | * | 1/1993 | | 219/553 |
| DE | 19846402 A1 | * | 4/2000 | | |
| EP | 523373 A1 | * | 1/1993 | | |
| JP | 09149999 A | * | 6/1997 | | D06F 79/02 |
| RU | 2163422 C1 | * | 2/2001 | | |
| WO | WO 03-017721 A2 | * | 2/2003 | | |

OTHER PUBLICATIONS

Translation of DE 4123129 (2 Pages) Jan. 21, 1993.*

* cited by examiner

*Primary Examiner* — Sang Y Paik
(74) *Attorney, Agent, or Firm* — Brian M. Dingman; Dingman, McInnes & McLane, LLP

(57) ABSTRACT

A system for generating radiant heat in a transit vehicle includes at least one floor panel having at least one heating element disposed therein, and a power switch operably disposed intermediate a power supply source and the heating element for selectively providing and discontinuing a supply of a predetermined power generated by such power supply source to and from such at least one heating element.

18 Claims, 3 Drawing Sheets

HEATED FLOOR PANEL FOR TRANSIT VEHICLE

FIELD OF THE INVENTION

The present invention relates, in general, to floor panels and, more particularly, this invention relates to electrically heated composite floor panels and, yet more particularly the instant invention relates to electrically heated composite floor panels for transit vehicle.

BACKGROUND OF THE INVENTION

As is generally well known, heating of a passenger compartment in a transit vehicle is achieved by a combination of several heating components. One heating component, which is known as a conventional baseboard electric heater, is installed longitudinally and in series on each side of the transit vehicle either at a juncture of the floor and the side wall or directly within the side wall and being somewhat elevated from the floor of the vehicle. Mounting of the baseboard heaters is interrupted by the side doors located within each side wall of the transit vehicle and which are used for passenger ingress and egress. The actual finned electric heating element is positioned behind a grill mesh that enables the generated heat to flow into the seating area. Baseboard heaters generate about forty percent of the required total heating energy. Additionally, the heat generated by baseboard heaters may be routed, by way of convection, within the side walls for entering the passenger compartment through the grills generally positioned slightly below the bottom edge of the side window.

Another heating component is mounted in series on the roof of the transit vehicle with generated heat being forced in a downward fashion via blowers into the passenger compartment from the grills positioned within or near a ceiling of such transit vehicle. Such roof mounted heaters generate remaining sixty percent of the total heating energy.

There are number of disadvantages of using baseboard heaters for heating passenger compartment of the transit vehicle.

Such heaters occupy between about ten and about twelve percent of the vehicle width thus reducing the actual usable space of the passenger compartment.

Use of stainless steel enclosures and finned electrical heating elements increase the installation costs, particularly in vehicles wherein the heating elements are mounted within the side wall and require structural supports which further increase the weight of the vehicle.

Baseboard heating elements typically operate at a temperature between about 400 degrees Fahrenheit and about 500 degrees Fahrenheit. Grills are positioned to maintain surface temperature of less than 125 degrees Fahrenheit as mandated by Americans With Disability Act (ADA). However, such baseboard heaters have been regarded as fire hazards due to the often close proximity of flammable items such as clothing, coats, baby blankets, briefcases, and the like. A heat transfer loss occurs through the portion of the side wall containing such baseboard heaters due to lack of insulation.

Baseboard heaters generally require the use of stainless steel enclosures and grills due to harsh chemicals being used in floor cleaning, which increases the installation costs.

Floor areas disposed adjacent each side door used for passenger ingress and egress are poorly heated, resulting in frequent floor structure failures due to moisture, such as rain, snow and sleet, entering the transit vehicle when doors are opened and as passengers ingress and egress the vehicle. Accordingly, door threshold heaters, when employed, must be designed to heat a portion of the vehicle adjacent to each side door resulting in increased manufacturing costs.

The baseboard heaters do not generally heat a portion of the floor, which is disposed along the longitudinal centerline of the transit vehicle and is further disposed between the seats. Standing passengers which use such portion of the floor are standing on a colder floor surface. It has been proven that a person experiences bodily warmth if ones feet are warmed despite a cool ambient temperature. Accordingly, higher heat energy must be generated from roof mounted heaters to compensate for this condition.

Therefore, there is a need for an improved system for at least partially heating passenger compartment of the transit vehicle.

SUMMARY OF THE INVENTION

According to a first embodiment of the invention, therein is provided a floor panel for a transit vehicle which includes a core having each of a predetermined size and a predetermined shape and a bottom skin rigidly attached to one surface of the core. At least one heating element has each of a predetermined size and a predetermined shape and is positioned within a respective groove formed in an opposed surface of the core. A top of the at least one heating element is essentially flush with the opposed surface. Ends of the at least one heating element are exposed within a cavity formed in a predetermined location of such floor panel. A top skin is rigidly attached to the opposed surface of the core.

According to a second embodiment, the invention provides a system for generating radiant heat in a transit vehicle. Such system includes at least one floor panel having a predetermined shape and a predetermined size and having at least one heating element disposed therein. A power switch is operably disposed intermediately to a power supply source of such transit vehicle and the at least one heating element for selectively providing and discontinuing a supply of a predetermined power generated by such power supply source to the at least one heating element.

According to a third embodiment, the present invention provides a method for generating radiant heat in a transit vehicle. The method includes the steps of installing at least one floor panel having at least one heating element disposed therein, connecting the at least one heating element to a power switch, then connecting the power switch to a power source of such transit vehicle capable of supplying a predetermined power, and selectively operating the power switch to provide and discontinue a supply of the predetermined power to the at least one heating element.

OBJECTS OF THE INVENTION

It is, therefore, one of the primary objects of the present invention to provide a system for generating even radiant heating within the passenger compartment of the transit vehicle.

Another object of the present invention is to provide a system for generating radiant heat within the passenger compartment of the transit vehicle that employs floor panels having a heating element disposed therein.

Yet another object of the present invention is to provide a system for generating radiant heat within the passenger compartment of the transit vehicle employing heated floor panels that are simpler to install than conventional baseboard heaters.

A further object of the present invention is to provide a system for generating radiant heat within the passenger compartment of the transit vehicle employing heated floor panels which adequately control surface temperature and do not pose fire hazards.

Yet, a further object of the present invention is to provide a system for generating radiant heat within the passenger compartment of the transit vehicle employing heated floor panels that is responsive to fluctuating interior and ambient temperatures.

An additional object of the present invention is to provide a system for generating radiant heat within the passenger compartment of the transit vehicle employing heated composite floor panels.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
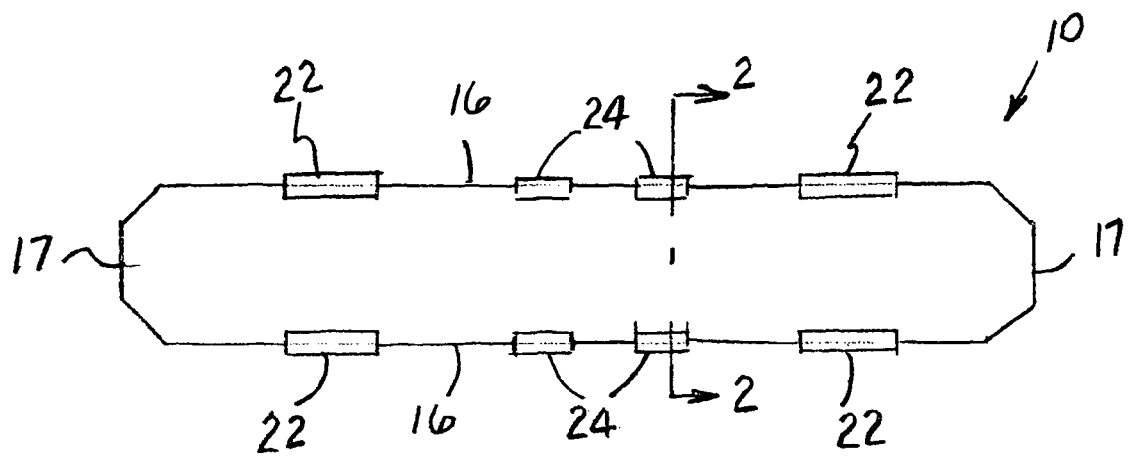
FIG. 1 is a schematic representation of a transit vehicle.

Prior to proceeding to the more detailed description of the present invention, it should be noted that, for the sake of clarity and understanding, identical components which have identical functions have been identified with identical reference numerals throughout the several views illustrated in the drawing figures.

It is to be understood that the definition of a transit vehicle includes but not limited to rail car, passenger rail vehicle, passenger transit bus, passenger utility bus, school bus, and utility vehicle.

Figure 2:
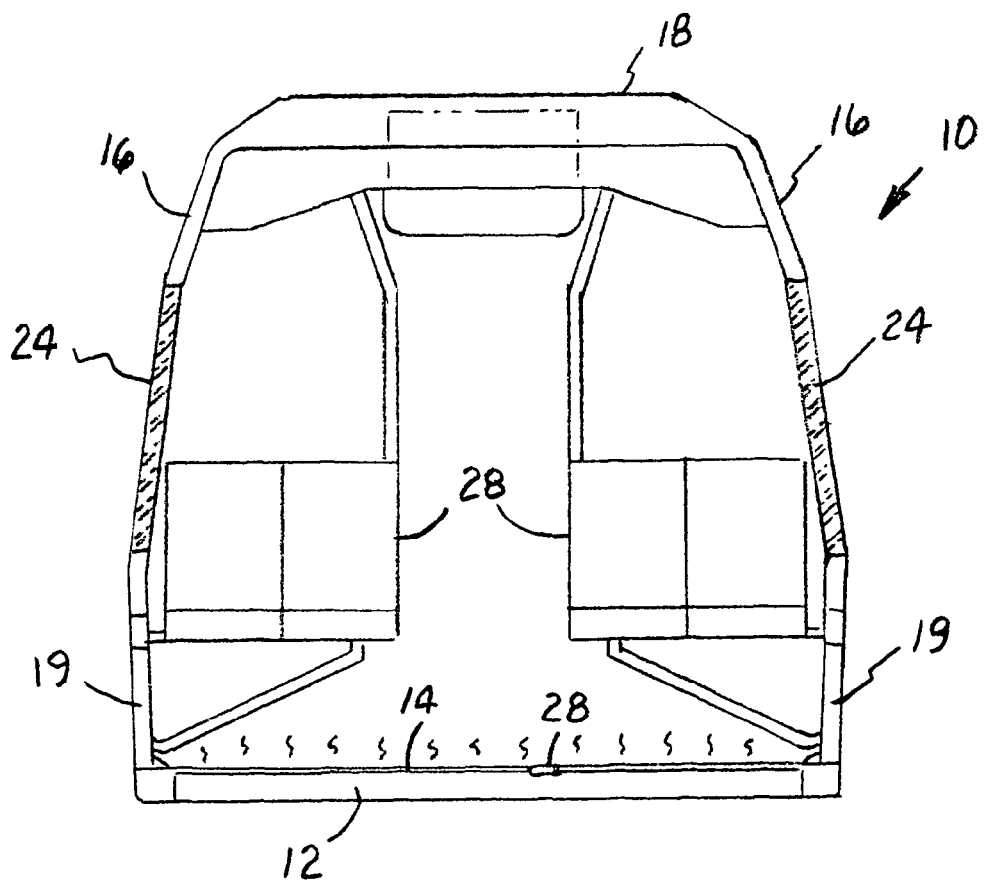
FIG. 2 is a cross-sectional view of the transit vehicle along lines 2-2 of FIG. 1.

To help the user in understanding the environment in which the present invention will be used, a transit vehicle 10, such as a passenger rail vehicle, is shown schematically in FIGS. 1-2. Such transit vehicle 10 is characterized by a sub-floor structure 12, floor 14, pair of generally hollow side walls 16, pair of end walls 17 and a roof 18 defining a passenger compartment 20. Plurality of doors 22 are provided within each side wall 16 for enabling passenger ingress and egress. Plurality of windows 24 are further provided within each side wall 16 for passenger comfort and for enabling entry of the natural light into the passenger compartment 20. Plurality of seats 26 are generally positioned adjacent each side wall 16. A floor cover 28, such as carpet or elastomer, is applied over the floor 14 for passenger comfort and safety.

The floor 14 may be formed as a single panel or formed from a plurality of floor panels 30.

Figure 3:
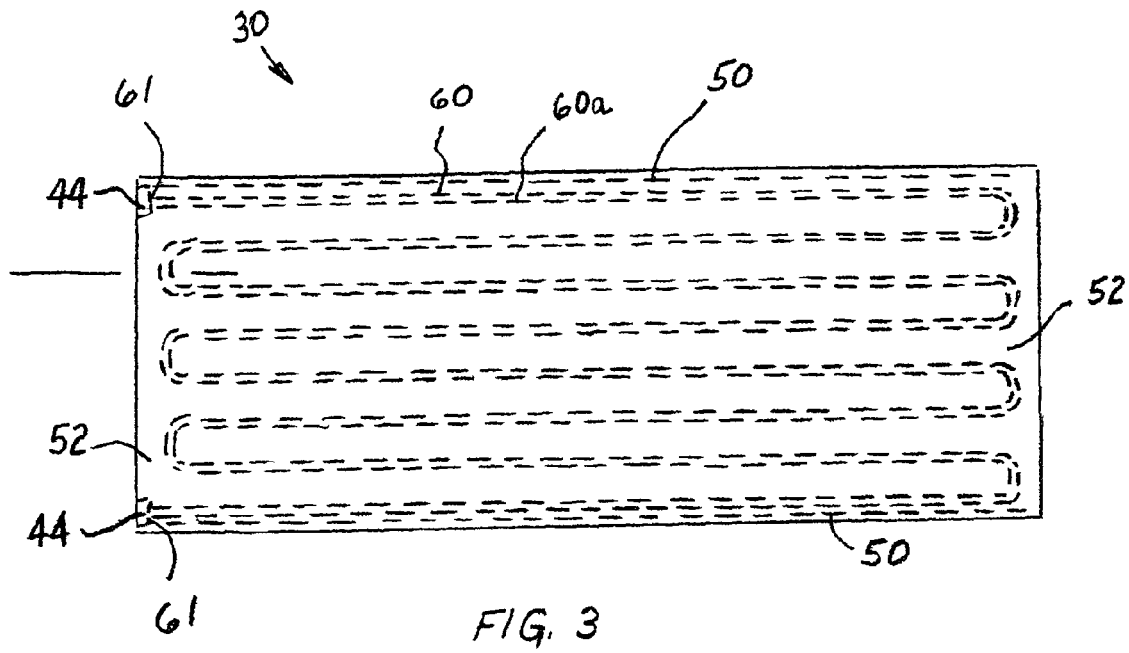
FIG. 3 is a planar view of the floor panel of the present invention particularly illustrating the presently preferred shape of the heating element.
Figure 4:
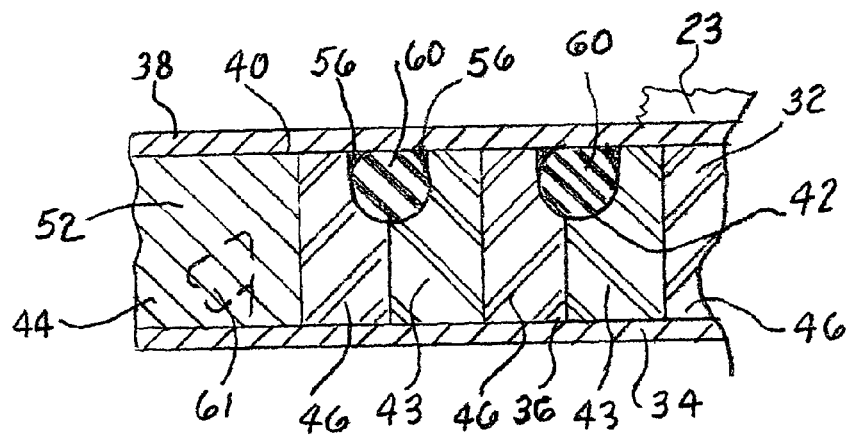
FIG. 4 is a partial cross-sectional view of the floor panel of the present invention along lines 4-4 of FIG. 3.
Figure 5:
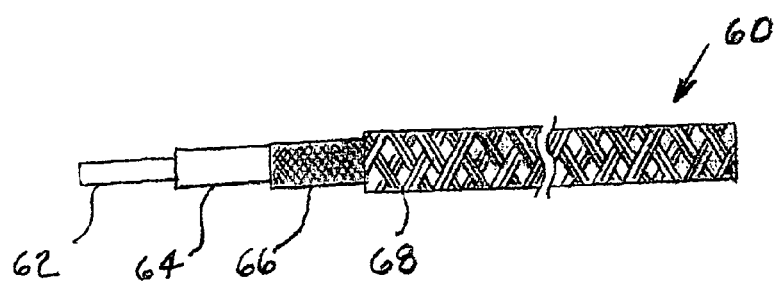
FIG. 5 is a partial schematic view of the presently preferred heating element construction for use with a floor panel of the present invention.

According to a first embodiment of the invention, there is provided a heated floor panel, generally designated as 30, and best shown in FIGS. 3-5, which includes a core 32 having each of a predetermined size and a predetermined shape. A bottom skin 34 is rigidly attached to a first surface 36 of the core 32. A top skin 38 is rigidly attached to the opposed second surface 40 of the core 32.

A heating element 60, having a predetermined size and a predetermined shape is positioned within a respective groove 42 formed in the second surface 40 of the core 32. A top of the heating element 60 is essentially flush with such second surface 40. A pair of ends 61 of the heating element 60 are exposed within at least one cavity 44 formed in a predetermined location of the floor panel 30, best shown by example in FIGS. 3-4 as a peripheral edge.

Such floor panel 30 may be of a type presently employed in the construction of the transit vehicle 10, wherein the core 32 is made from wood, and more particularly a plywood, and the bottom skin 34 and the top skin 38 are made from metal such as stainless steel. In such embodiment, a sealant 44 is applied to the surface of the groove 42 prior to positioning of the heating element 60 therein to prevent moisture penetration into such core 32. Alternatively, such core 32 may be made from foam or honeycomb material, which are well known in the art.

Preferably, such floor panel 30 is a composite floor panel 30, wherein each of the core 32, the bottom skin 34 and the top skin 38 is made from a non-metallic material.

One type of such composite floor panel 30 is taught by U.S. Pat. No. 6,824,851 to Locher et al and the teachings of such U.S. Pat. No. 6,824,851 are incorporated into this document by reference thereto.

In this embodiment the core 32 is a precured reinforced core formed by a plurality of phenolic ribs 46 and a plurality of foam strips 48 positioned in an alternating fashion. A pair of side closeouts 50 and a pair of end closeouts 52 abuttingly engage the top skin 38 and the bottom skin 34 and surround the core 32, thus substantially defining a perimeter of the floor panel 30. Each of such pair of side closeouts 50 and a pair of end closeouts 52 is a fiber reinforced material having a thickness that is substantially greater than a thickness of the top skin 38 and a thickness of the bottom skin 34.

The material of the top skin 38, the bottom skin 34, and closeouts 50 and 52 is a phenolic composite.

To increase heat transfer efficiency of the floor panel 30, a heat transfer compound 56 is disposed within a void formed in the second surface 40 of the core 32 after the heating element 60 is positioned within the groove 42. By way of example, such heat transfer compound 64 is a thermal mastic distributed by Virginia KMP Corporation of Dallas, Tex.

The heating element 60 of a presently preferred embodiment is a series resistance constant wattage electric heater 60, best shown in FIG. 5, which includes an electrical conductor 62, an insulation layer 64 surrounding the electrical conductor 62, a jacket 56 surrounding the insulation layer 64 and a metallic braid 68 surrounding the jacket 66.

It will be apparent to those skilled in the relevant art form that series resistance two conductor zone heaters, series resistance power limiting zone heaters and self regulating electric heaters can be utilized in the floor panel 30 of the present invention.

The presently preferred shape of such heating element 60 is a serpentine.

It is further presently preferred that such floor panel 30 includes a second heating element 60a positioned in a second groove 42. It will be appreciated that the second heating element 60 improves reliability of the floor panel 30 should the first heating element 60 be mechanically damaged during installation of the floor panel 30 or during modifications commonly performed within such transit vehicle 10.

Figure 6:
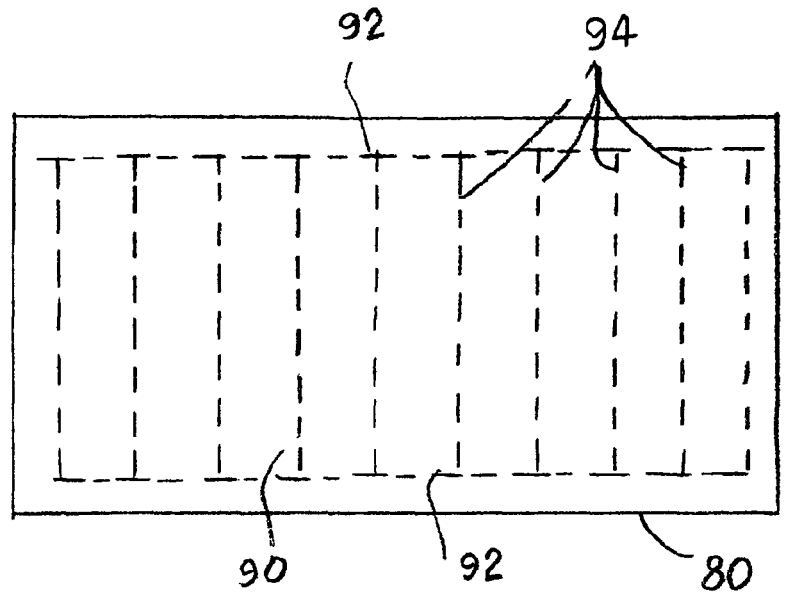
FIG. 6 is a planar view of the floor panel of the present invention particularly illustrating an alternative shape of the heating element.

Alternatively, as best shown in FIG. 6, the floor panel 80 may include a heating element 90 formed as a pair of parallel spaced bus elements 92 oriented in one direction and a plurality of interconnecting elements 94 disposed generally perpendicular to such pair of bus elements 92. Accordingly, a groove (not shown) corresponding to the shape of the heating element 90 will be formed within the second surface of a core 82 to accommodate such heating element 90.

Figure 7:
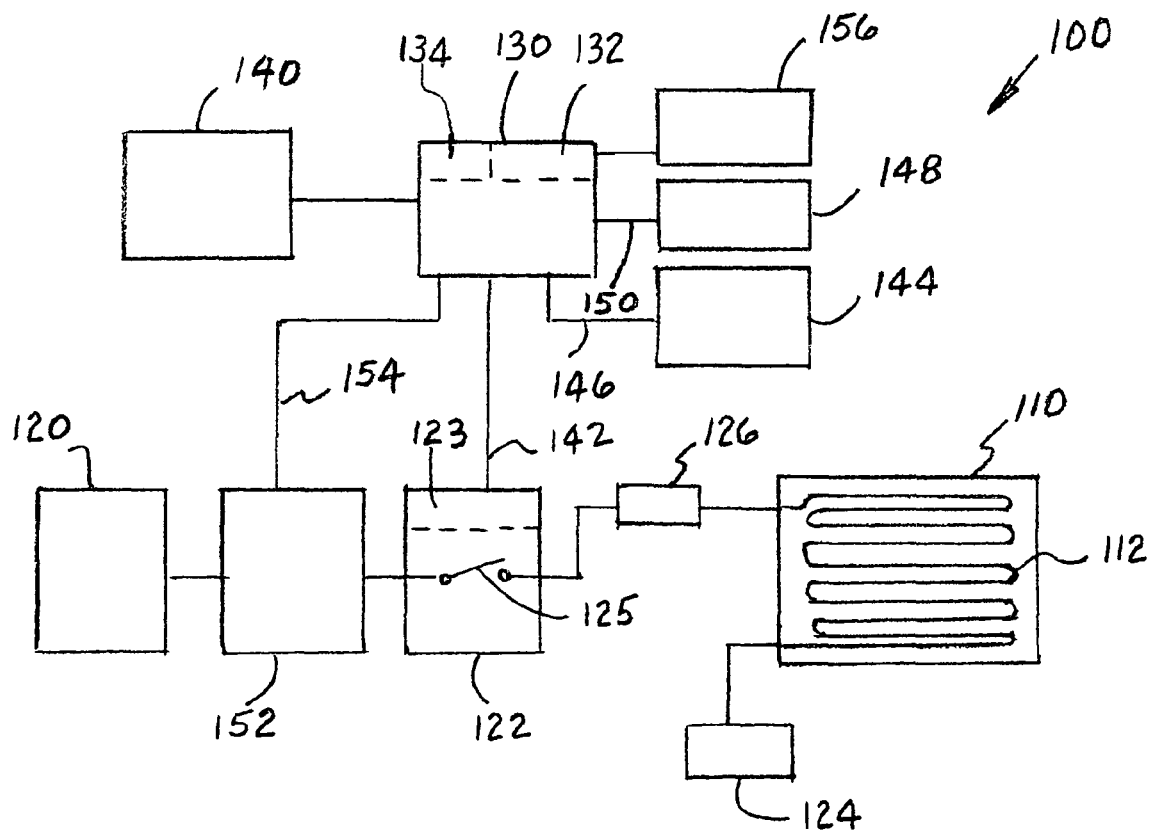
FIG. 7 is a schematic representation of a presently preferred system for generating radiant heat within a transit vehicle.

According to a second embodiment, best shown in FIG. 7, the present invention provides a system, generally designated as 100, for generating radiant heat. Such system 100 includes at least one panel 110 having a predetermined shape and a predetermined size and having at least one heating element 112 disposed therein. A power source 120 is provided for supplying a predetermined power and a power switch 122 is operably coupled intermediately to the power source 120 and one end of the at least one heating element 112 for selectively providing and discontinuing a supply of the predetermined power to the at least one heating element 112. Preferably, such at least one heating element 112 is an electric heating element and such predetermined power is voltage. Such voltage is generally available as either 480 VAC or 600-750 VDC. The other end of the at least one heating element 112 is connected to a ground 124. A fuse 126 may be provided for protecting the system 100 from excessive current.

The power switch 122 may be manually operable and, preferably, such power switch 122 is a well known contactor having a coil 123 and at least one set of contacts 125 disposed therein and the system 100 includes a controller 130 coupled to the coil 123 of the power switch 122 and to a control power source 140 for controlling operation of the at least one heating element 112. The controller 130 is preferably a microprocessor. Based on a predetermined logic, the controller 130 selectively supplies a control signal 142 to the coil 123 of the power switch 122 causing the at least one set of contacts 125 to close and allow flow of the voltage therethrough in order to activate the at least one heating element 112 or discontinues the supply of such control signal 142 to deactivate the at least one heating element 112.

In combination with the transit vehicle 10, the system 100 may further include a temperature sensor 144 coupled to the controller 130 for continuously providing a temperature signal 146 thereto. Such temperature sensor 144 is preferably mounted for sensing the temperature within the passenger compartment 20. The processor 132 disposed within the controller 130 is adapted to compare such temperature signal 146 against a temperature default stored within a memory 134 and enable the controller 130 to selectively supply or discontinue such control signal 142. Preferably, a pair of temperatures defaults, one having a lower value and the other one having a higher value are stored within the memory 134. Accordingly, the control signal 142 will be provided when the temperature signal 146 is about equal to the temperature default having a lower value and is discontinued when the temperature of the passenger compartment 20 increases and the temperature signal 146 is about equal to the temperature default having a higher value.

It will be appreciate that more than one temperature sensor 144 may be mounted in various locations within the transit vehicle 10, each providing a distinct temperature signal to the controller 130 which is advantageous in applications employing zoned heating and having a plurality of distinctly controlled heating elements 112. In such embodiment, the controller 130 will be capable of providing a plurality of control signals 142 each received by a respective power switch 142.

Furthermore, at least one externally mounted temperature sensor 148 may be provided for sensing an ambient temperature and for supplying a second temperature signal 150 to the controller 130. Such second temperature signal 150 may be used for varying the values of the temperature defaults stored within the memory 134 and, more particularly, for adjusting the operating temperature of the passenger compartment 20 according to the existing ambient temperature that may fluctuate over time.

The system 100 may be further provided with a current monitor 152 coupled intermediately to the power source 120 and the power switch 122 for monitoring the operating current of the system 100 and for providing a corresponding electrical current signal 154 to the controller 130 which is then compared against at least one threshold current signal stored within memory 134 to detect one of normal and abnormal operation of such at least one heating element 112.

The system 100 may further include at least one indicating means 156 operable by such controller 130 for indicating at least one of normal and abnormal operation of such at least one heating element 112. Such at least one indicating means 156 may be one of indicator, light and alarm. Furthermore, the at least one indicating means 156 may be directly connected to the power switch 122.

Preferably, the design and operation of the at least one heating element 112 are carried out to limit the surface temperature of such at least one panel 110 and associated floor covering 28 at about 125 degrees Fahrenheit in order to meet ADA mandate.

According to the third embodiment, therein provided a method for generating radiant heat within the passenger compartment 20 of the transit vehicle 10. The method includes the steps of installing at least one floor panel having a predetermined shape and a predetermined size and having at least one heating element disposed therein. Then connecting the at least one heating element to a power switch. Connecting the power switch to a power source of such transit vehicle which is capable of supplying a predetermined power. Then operating the power switch to selectively provide and discontinue a supply of the predetermined power to the at least one heating element. The method may include an additional step of providing a control means for responsive to various signals, such as temperature and current, for operating such power switch.

It will be understood that the floor construction of the transit vehicle 10 employing heating elements to generate radiant heat has a number of advantages as compared with conventional baseboard heaters. Removal of the conventional baseboard heaters and associated grills simplifies side wall construction thereby reducing manufacturing costs of such transit vehicle 10 as well as reduces life cycle maintenance costs associated with such baseboard heaters. Side wall space occupied by conventional baseboard heaters can be now insulated as illustrated by reference numerals 19 in FIG. 2 to reduce heat energy loss through such side walls and, more particularly, reduce cost of heating such transit vehicle 10. The maximum temperature of the heating element is set at 125 degrees Fahrenheit to meet ADA requirements and in combination with the floor panel construction eliminates fire hazard associated with conventional baseboard heaters.

Heated floor area disposed adjacent to each side door 22 at least minimizes moisture accumulation and, more particularly, prevent structural floor failures.

Although the present invention has been shown in terms of the heated floor panel for use with a transit vehicle such as a passenger rail vehicle, it will be apparent to those skilled in the art, that the present invention may be applied to other vehicles.

Furthermore, it will be understood that each floor panel may be individually coupled to the power source of the transit vehicle, may be mechanically and electrically interconnected in series with several other floor panels into a floor cluster, and may be mechanically and electrically interconnected in series with all other floor panels within such transit vehicle wherein only the end panels are connected to the power source.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. In combination with a transit vehicle, said transit vehicle selected from the group consisting of rail car, passenger rail vehicle, passenger transit bus, passenger utility bus, and school bus, a system for generating radiant heat within interior portion of said transit vehicle, said system comprising:
   (a) at least one floor panel mounted above a sub-floor structure of said transit vehicle and being sufficiently rigid so as to meet rigors of passenger traffic in a mass transit environment and having each of a predetermined shape and a predetermined size, said at least one floor panel further having at least one heating element disposed therein;
   (b) a power switch operably disposed intermediate a power supply source of said transit vehicle and said at least one heating element for selectively providing and discontinuing a supply of a predetermined power generated by said power supply source to said at least one heating element; and
   (c) said at least one heating element is at least one electric heating element and said system includes a controller coupled to said power switch and to a control power supply source for controlling operation of said at least one heating element, said control power supply source being independent from said power supply source for operating said at least one heating element.

2. The system, according to claim 1, wherein said system further includes at least one temperature sensing means coupled to said controller for providing a temperature signal thereto.

3. The system, according to claim 2, wherein said at least one temperature sensing means senses temperature within said interior portion of said transit vehicle and wherein said temperature signal is indicative of said interior temperature.

4. The system, according to claim 3, wherein said controller includes a memory having a predetermined temperature default stored therein and wherein said temperature signal is compared with said predetermined temperature default.

5. The system, according to claim 4, wherein said predetermined temperature default includes a temperature range having each of an upper and a lower value.

6. The system, according to claim 2, wherein said at least one temperature sensing means senses ambient temperature external to said transit vehicle.

7. The system, according to claim 1, wherein said system further includes a current monitoring means operably disposed intermediate such power supply source and said power switch and coupled to said controller for providing an electrical current signal thereto.

8. The system, according to claim 1, wherein said system further includes an indicating means coupled to at least one of said power switch and said controller for indicating operation of said at least one heating element.

9. The system, according to claim 1, wherein said predetermined power supplied to said at least one heating element is a predetermined voltage.

10. The system, according to claim 9, wherein said voltage is one of about four hundred and eighty (480) volts of alternative current and between about six hundred (600) and about seven hundred and fifty (750) volts of direct current.

11. The system, according to claim 1, wherein said system includes a fuse operatively connected between said power switch and said at least one heating element so as to protect said system from excessive current.

12. The system, according to claim 1, wherein said at least one heating element is mounted under and in close proximity to a top surface of said at least one floor panel.

13. The system, according to claim 12, wherein said at least one floor panel includes a floor covering disposed on a top surface thereof and wherein said at least one heating element is operable to limit a surface temperature of said floor covering to about one hundred and twenty five (125) degrees Fahrenheit.

14. In combination with a transit vehicle, said transit vehicle selected from the group consisting of rail car, passenger rail vehicle, passenger transit bus, passenger utility bus, and school bus, a system for generating radiant heat within interior portion of said transit vehicle, said system comprising:
   (a) at least one floor panel mounted above a sub-floor structure of said transit vehicle and being sufficiently rigid so as to meet rigors of passenger traffic in a mass transit environment and having each of a predetermined shape and a predetermined size, said at least one floor panel further having at least one heating element disposed therein;
   (b) a power switch operably disposed intermediate a power supply source of said transit vehicle and said at least one heating element for selectively providing and discontinuing a supply of a predetermined power generated by said power supply source to said at least one heating element; and
   (c) said at least one heating element at least includes an electrical conductor, an insulation layer surrounding said electrical conductor, a jacket surrounding said insulation layer and a metallic braid surrounding said jacket.

15. In combination with a transit vehicle, said transit vehicle selected from the group consisting of rail car, passenger rail vehicle, passenger transit bus, passenger utility bus, and school bus, a system for generating radiant heat within interior portion of said transit vehicle, said system comprising:
   (a) at least one floor panel mounted above a sub-floor structure of said transit vehicle and being sufficiently rigid so as to meet rigors of passenger traffic in a mass transit environment and having each of a predetermined shape and a predetermined size, said at least one floor panel further having at least one heating element disposed therein;
   (b) a power switch operably disposed intermediate a power supply source of said transit vehicle and said at least one heating element for selectively providing and discontinuing a supply of a predetermined power generated by said power supply source to said at least one heating element; and (c) said power switch is a contactor having a coil and at least one set of open contacts disposed therein, wherein a supply of a control signal to said coil causes said open contacts to close allowing flow of said supply power therethrough.

16. The system, according to claim 15, wherein said system further includes a controller operatively coupled to said coil and to a source of control power, said controller supplies said control signal in accordance with a predetermined logic.

17. In combination with a transit vehicle selected from the group consisting of rail car, passenger rail vehicle, passenger transit bus, passenger utility bus, and school bus, a system for generating radiant heat within interior portion of said transit vehicle, said system comprising:

(a) at least one floor panel mounted above a sub-floor structure of said transit vehicle and being sufficiently rigid so as to meet rigors of passenger traffic in a mass transit environment and having each of a predetermined shape and a predetermined size;

(b) at least one heating element operatively mounted under and in close proximity to a top surface of said at least one floor panel and operable by a supply of operating voltage from a power supply source of said transit vehicle;

(c) a power switch operatively disposed between said power supply source and said at least one heating element, said power switch having a coil and at least one set of open contacts disposed therein, said coil operable by a presence of a control signal to close said at least one set of open contacts permitting flow of said operating voltage therethrough to said at least one heating element;

(d) a controller having each of a memory and a processor, said controller operatively coupled to said coil and selectively generating said control signal in accordance with a predetermined logic;

(e) a source of control power operatively coupled to said controller;

(f) a current monitoring means operatively disposed between said power supply source and said power switch and coupled to said controller for providing an electrical current signal thereto, whereby said processor compares said electrical current signal with a current threshold stored within said memory;

(g) at least one first temperature sensor operatively coupled to said controller and providing at least one first temperature signal indicative of a temperature within said interior portion of said transit vehicle, whereby said processor compares said at least one first temperature signal with a pair of temperature defaults stored within said memory, whereby said predetermined logic causes said controller to generate said control signal when said at least one first temperature signal is about equal to one of said pair of temperature defaults having a lower value and whereby said predetermined logic causes said controller to discontinue said control signal when said at least one first temperature signal is about equal to an opposed one of pair of temperature defaults having a higher value;

(h) a second temperature sensor operatively coupled to said controller and providing at least one second temperature signal indicative of ambient temperature external to said transit vehicle;

(i) a fuse operatively connected between said power switch and said at least one heating element so as to protect said system from excessive current; and (j) an indicating means coupled to at least one of said power switch and said controller for indicating operation of said at least one heating element.

18. In combination with a transit vehicle, said transit vehicle selected from the group consisting of a rail car, a passenger rail vehicle, a passenger transit bus, a passenger utility bus, and a school bus, an improvement comprising a system for generating radiant heat within interior portion of said transit vehicle, said system including:

(a) at least one floor panel mounted above a sub-floor structure of said transit vehicle and being sufficiently rigid so as to meet rigors a mass transit environment, said at least one floor panel further having each of at least one heating element disposed within said at least one floor panel between upper and lower surfaces thereof and a heat transfer compound also disposed within said panel in operative engagement with said at least one heating element; and (b) a power switch operatively disposed between a power supply source of said transit vehicle and said at least one heating element for selectively providing and discontinuing a supply of a predetermined power generated by said power supply source to said at least one heating element.

* * * * *